(12) United States Patent
Sato et al.

(10) Patent No.: US 7,351,489 B2
(45) Date of Patent: Apr. 1, 2008

(54) FUEL CELL UNIT

(75) Inventors: Yuusuke Sato, Bunkyo-ku (JP); Kaname Miyazaki, Yokohama (JP); Eiichi Sakaue, Shinagawa-ku (JP); Kei Matsuoka, Kawasaki (JP); Atsushi Sadamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 645 days.

(21) Appl. No.: 10/811,846

(22) Filed: Mar. 30, 2004

(65) Prior Publication Data
US 2004/0247979 A1 Dec. 9, 2004

(30) Foreign Application Priority Data
Apr. 1, 2003 (JP) ............... 2003-098358

(51) Int. Cl.
*H01M 2/02* (2006.01)
*H01M 8/04* (2006.01)
(52) U.S. Cl. ............... 429/34; 429/26; 429/38
(58) Field of Classification Search ........... 429/34, 429/26, 38
See application file for complete search history.

(56) References Cited
U.S. PATENT DOCUMENTS
6,630,264 B2 * 10/2003 Haltiner et al. ............... 429/32
6,783,882 B2 * 8/2004 Schmidt ....................... 429/34
2004/0062962 A1 * 4/2004 Ozeki ........................... 429/22
2004/0219414 A1 * 11/2004 Ozeki ........................... 429/34

FOREIGN PATENT DOCUMENTS

| JP | 60-54177 | | 3/1985 |
|---|---|---|---|
| JP | 1-320775 | | 12/1989 |
| JP | 5-290868 | | 11/1993 |
| JP | 05290868 A | * | 11/1993 |
| JP | 11-86891 | | 3/1999 |
| JP | 11086891 A | * | 3/1999 |
| JP | 2003-77505 | | 3/2003 |

OTHER PUBLICATIONS

U.S. Appl. No. 10/668,161, filed Sep. 24, 2003, Sakaue et al.

* cited by examiner

*Primary Examiner*—Tracy Dove
(74) *Attorney, Agent, or Firm*—Oblon, Spivak, McClelland, Maier & Neustadt, P.C.

(57) ABSTRACT

A fuel cell unit is provided with a fuel cell for electric power generation, a mixing tank housing a mixture of fuel and exhaust from the fuel cell, a fuel tank housing the fuel, a pump delivering the mixture and air to the fuel cell, a casing housing the fuel cell, the pump and at least one of the fuel tank and the mixing tank and a partition partitioning an interior of the casing into a first compartment housing the fuel cell and a second compartment. The partition is provided with first, second and third flow paths. The first flow path connects the mixing tank to the fuel cell. The second flow path connects the fuel cell to the pump. The third flow path connects the pump to the mixing tank.

14 Claims, 10 Drawing Sheets

US 7,351,489 B2

FUEL CELL UNIT

CROSS-REFERENCE TO RELATED APPLICATIONS

This application is based upon and claims the benefit of priority from the prior Japanese Patent Application No. 2003-098358 (filed Apr. 1, 2003); the entire contents of which are incorporated herein by reference.

BACKGROUND OF THE INVENTION

1. Field of the Invention

The present invention relates to a fuel cell unit which is compactly constituted.

2. Description of the Related Art

A fuel cell unit for a direct methanol fuel cell ("DMFC" hereinafter) is provided with a fuel tank for housing methanol as fuel, a mixing tank for forming a mixture of the methanol and water, a fuel cell stack composed of plural unit fuel cells, each of which is provided with a cathode, an anode and a solid polymer electrolyte membrane put therebetween, and pumps for feeding the mixture and air to the fuel cell stack and supplementary elements.

Japanese Patent Application Laid-open No. H09-171872 discloses a related art in which a fuel cell unit is housed in a casing for ease of handling.

SUMMARY OF THE INVENTION

According to the above related art, the casing houses several elements constituting the fuel cell unit, however, compactness thereof is not sufficient.

The present invention is intended for providing a fuel cell unit which is compactly constituted.

According to a first aspect of the present invention, a fuel cell unit is provided with a fuel cell for electric power generation; a mixing tank housing a mixture of fuel and exhaust water from the fuel cell; a fuel tank housing the fuel; a pump delivering the mixture and air to the fuel cell; a casing housing the fuel cell, the pump and at least one of the fuel tank and the mixing tank; and a partition partitioning an interior of the casing into a first compartment housing the fuel cell and a second compartment, the partition comprising first, second and third flow paths, the first flow path connecting the mixing tank to the fuel cell, the second flow path connecting the fuel cell to the pump, the third flow path connecting the pump to the mixing tank.

According to a second aspect of the present invention, a fuel cell unit is provided with a fuel cell for electric power generation; a mixing tank housing a mixture of fuel and exhaust water from the fuel cell and connected to the fuel cell; a fuel tank housing the fuel and connected to the mixing tank; a pump connected to both the fuel cell and the mixing tank, the pump negatively pressurizing the fuel cell whereby delivery of the fuel to the mixing tank and delivery of the mixture and air to the fuel cell are done by the pump.

According to a third aspect of the present invention, a fuel cell unit is provided with a fuel cell for electric power water generation; a mixing tank housing a mixture of fuel and exhaust from the fuel cell; a fuel tank housing the fuel and comprising a porous body disposed along an interior wall of the fuel tank and a flow path connecting the porous body to the fuel cell; and a pump delivering the mixture and air to the fuel cell.

According to a fourth aspect of the present invention, a fuel cell unit is provided with a fuel cell for electric power generation; a mixing tank housing a mixture of fuel and exhaust from the fuel cell and comprising a porous body disposed along an interior wall of the mixing tank, a cavity portion, an inflow path connecting the fuel cell to the cavity portion and an exhaust flow path connecting the cavity portion to an outside of the mixing tank; a fuel tank housing the fuel; and a pump delivering the fuel to the fuel cell.

DETAILED DESCRIPTION OF THE INVENTION

Figure 1:
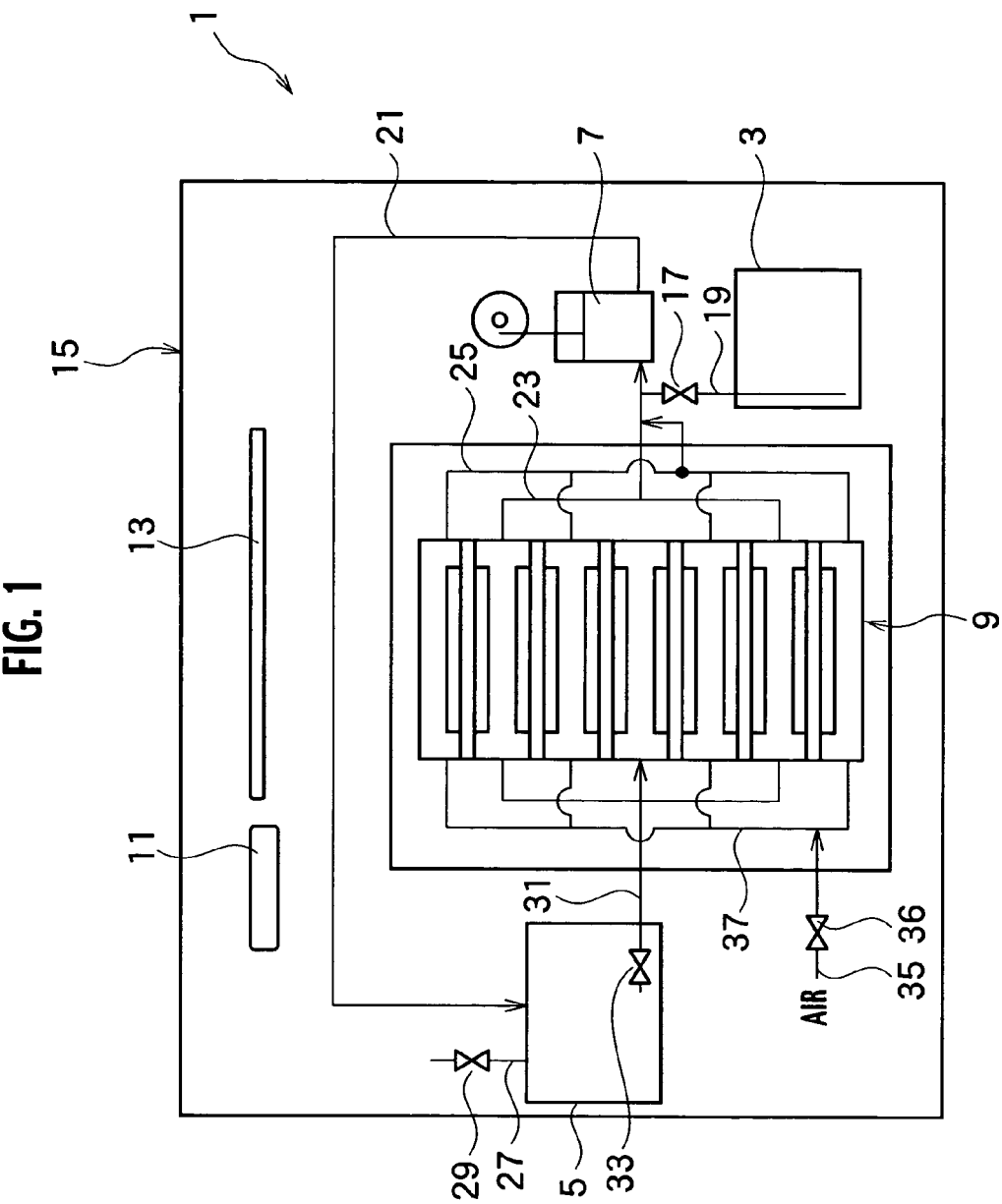
FIG. 1 is a schematic drawing of a fuel cell unit according to a first embodiment of the present invention.

A constitution of a fuel cell unit 1 according to a first embodiment of the present invention will be described hereinafter with reference to FIG. 1.

The fuel cell unit 1 is provided with a fuel tank 3 for housing methanol as fuel, a mixing tank 5 for forming a mixture of the methanol and water, a pump 7, a fuel cell 9 and a printed-circuit board 13. The fuel cell 9 has a stacked structure composed of plural unit fuel cells, each of which is provided with a cathode, an anode and a solid polymer electrolyte membrane put therebetween. The printed-circuit board 13 is provided with a control circuit and a rechargeable battery 11 such as a lithium-ion battery for a power source thereof. The whole elements constituting the fuel cell unit 1 are housed in a casing 15.

The fuel tank 3 is connected to a suction port of the pump 7 via a flow path 19, which has a regulation valve 17. A discharge port of the pump 7 is connected to the mixing tank 5 via a flow path 21. To the suction port, an anode exhaust port 23 and a cathode exhaust port 25 of the fuel cell 9 are further connected.

The mixing tank 5 is provided with an exhaust flow path 27 for exhausting gas separated from a gas-liquid mixture formed from an inflow through the flow path 21. The flow path 27 is further provided with an open-close valve 29, which is also controllable of flow regulation. The mixing tank 5 is connected to the fuel cell 9 via an anode supply path 31 provided with a flow regulator 33, such as a needle valve or an orifice for example. The fuel cell 9 is provided with a cathode supply path 37 having a flow regulator 36, such as a needle valve or an orifice for example, which communicates with an air inlet port 35.

When the control circuit on the printed-circuit board 13 regulates and drives the pump 7, a negative pressure is applied to the suction port of the pump 7 and hence the anode and cathode exhaust ports 23 and 25 are negatively pressurized. Thereby the mixture of the methanol and the water in the mixing tank 5 and the air from the air inlet port 35 are sucked and supplied to the fuel cell 9.

Water and carbon dioxide generated by a cell reaction in the fuel cell 9, unreacted air and methanol-water mixture and such are sucked to the suction port of the pump 7. At the same time, the methanol housed in the fuel tank 3 is sucked thereto, however, a flow rate thereof is regulated by the regulation valve 17. These fluids sucked by the pump 7 are fed through the flow path 21 into the mixing tank 5.

In the mixing tank 5, gas-liquid separation from the mixture of the fluids is done. Gas separated from the mixture is exhausted through the exhaust flow path 27 to the outside. Thereby methanol-water mixture is left in the mixing tank 5 and supplied to the fuel cell 9 via the anode supply path 31 in a condition that the flow regulator 33 regulates the flow rate thereof.

As will be understood from the aforementioned description, according to the present embodiment, the supply of the fuel to the mixing tank 5 and the supply of the mixture and the air to the fuel cell 9 are collectively done by the pump 7 without any other pump means. Therefore the number of the elements therein can be decreased and hence the total constitution of the fuel cell unit 1 can be compactly configured.

Figure 2:
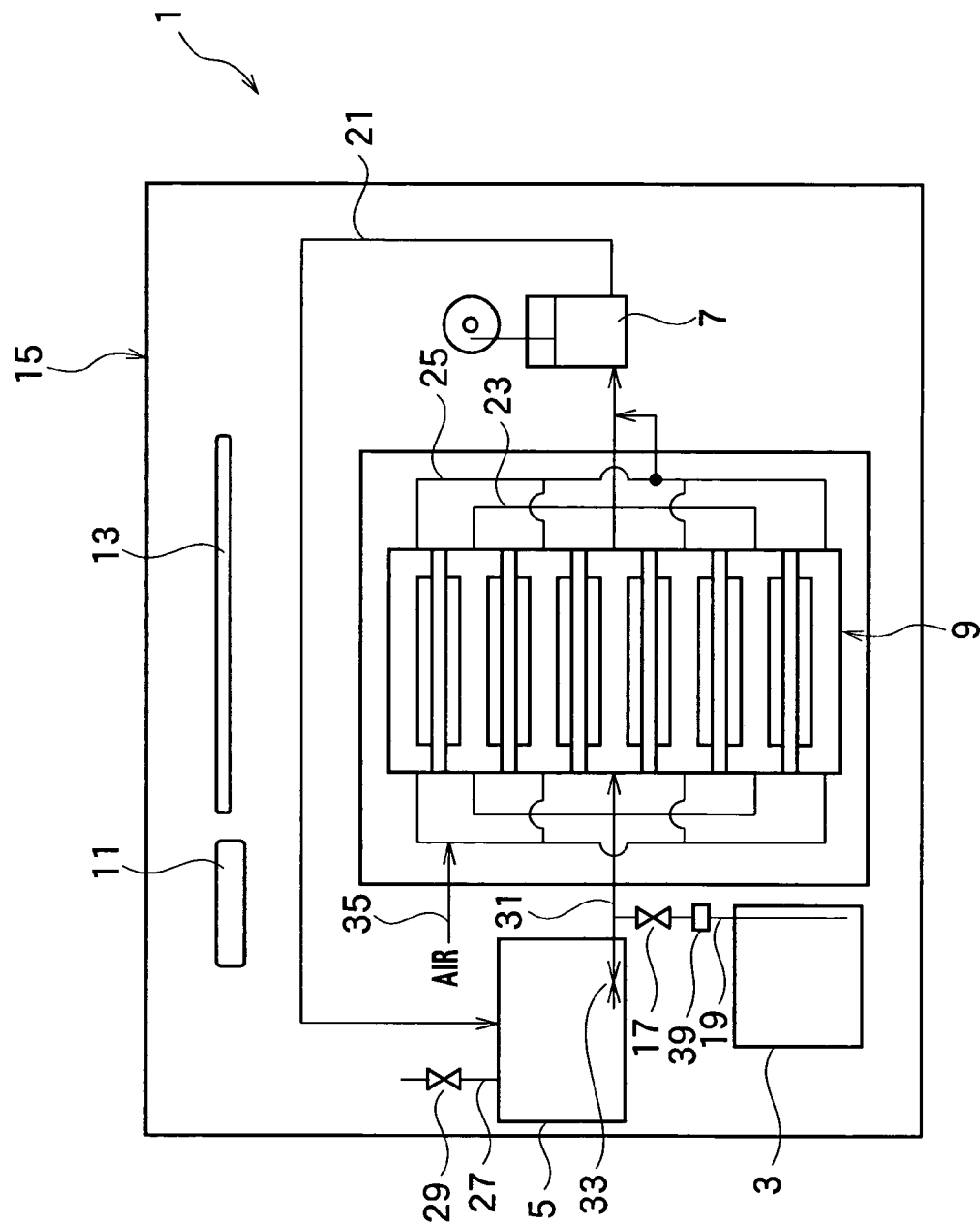
FIG. 2 is a schematic drawing of a fuel cell unit according to a second embodiment of the present invention.

A constitution of a fuel cell unit 1 according to a second embodiment of the present invention will be described hereinafter with reference to FIG. 2.

As compared with the above first embodiment, in the present second embodiment, the fuel tank 3 is connected to the anode supply path 31. Seen from a view point of the pump 3, the fuel cell 9 is disposed upstream of the pump 3 and the fuel tank 3 is further upstream thereof. Therefore, a compact supplementary pump 39 is preferably provided and disposed on the flow path 19. Though the total constitution is larger for that in a case where the supplementary pump 39 is provided, nearly the same effect as the above first embodiment can be achieved.

Figure 3:
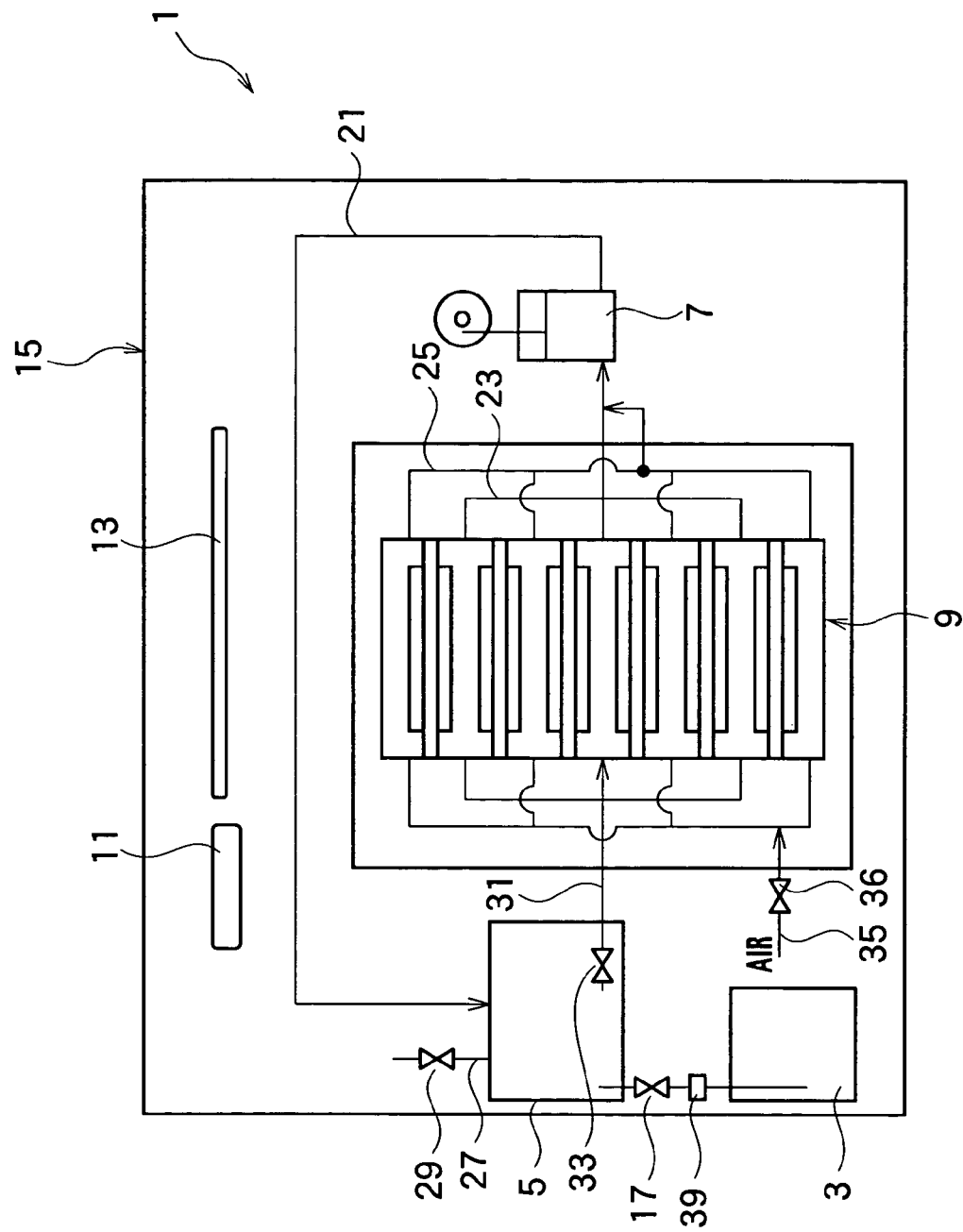
FIG. 3 is a schematic drawing of a fuel cell unit according to a third embodiment of the present invention.

FIG. 3 shows a third embodiment of the present invention. In the present embodiment, the fuel tank 3 is directly connected to the mixing tank 5 as compared with the above first and second embodiments. The compact supplementary pump 39 is also preferably provided. According to the present embodiment, the same effect as the above second embodiment can be achieved.

Figure 4:
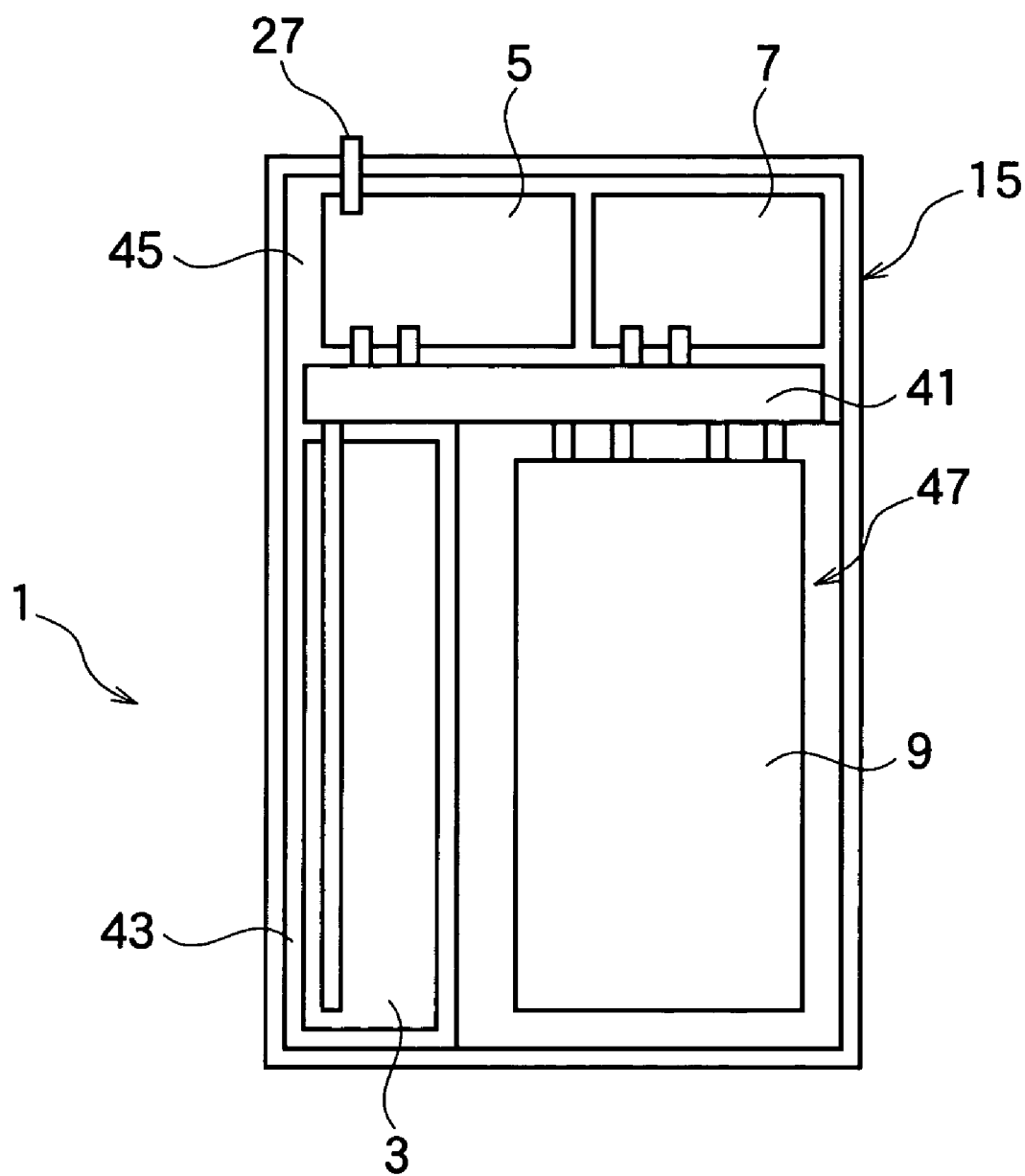
FIG. 4 is a schematic drawing showing a packaging manner of the fuel cell unit in a casing according to a version of the present invention.

The fuel tank 3, the mixing tank 5, the pump 7, the fuel cell 9 and the other elements, all of which constitute the fuel cell unit 1 the fuel cell unit 1 according to any of the first through third embodiments, are housed in the casing 15 as exemplarily shown in FIG. 4.

The casing 15 is provided with a manifold 41, which functions as a partition for partitioning the interior of the casing 15 into a heat-source compartment 43 and a normal-temperature compartment 45. The heat-source compartment 43 houses the fuel cell 9 and the fuel tank 3 so as to leave a thermal insulation space 47. The thermal insulation space 47 is configured to keep the fuel cell 9 at a temperature from 60 degrees C. to 80 degrees C. preferable to power generation and preferably provided with any thermal insulation material. The normal-temperature compartment 45 houses the pump 7, the mixing tank 5 and the printed-circuit board 13 with a control circuit and a rechargeable battery 11 (11 and 13 are not shown in FIG. 4).

Figure 5:
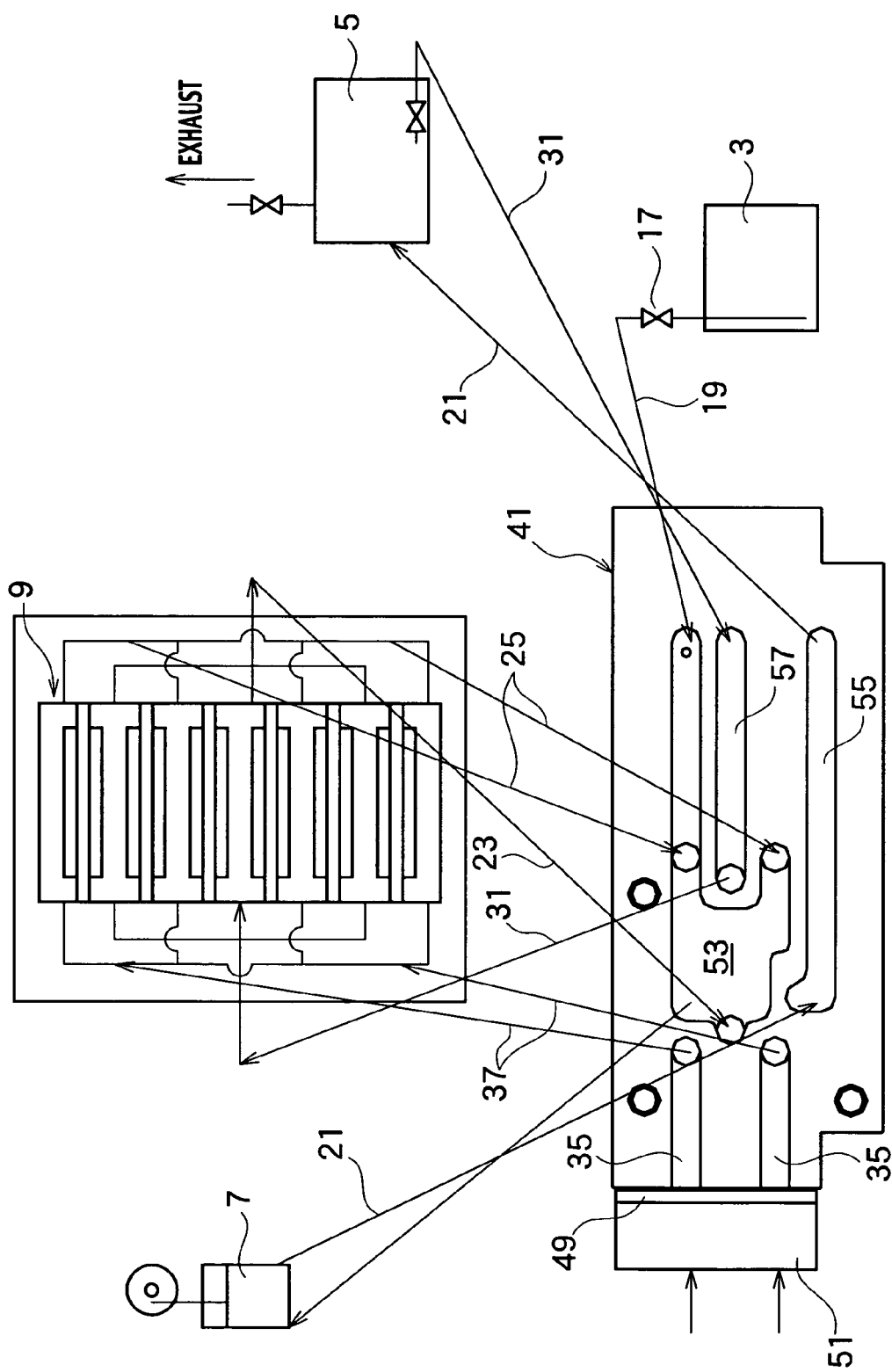
FIG. 5 is a schematic drawing showing a connection manner between a manifold and flow paths.

The manifold 41 has an opening of the air inlet port 35 at the side thereof as shown in FIG. 5. The opening of the air inlet port 35 is provided with a gas-liquid separation film 49, which allows penetration of gas but prevents penetration of liquid, and a filter 51. The cathode supply path 37 is connected to the air inlet port 35.

Moreover, the manifold 41 is provided with a suction path 53 communicating with the suction port of the pump 7. The flow path 19 communicating with the fuel tank 3 is connected to the suction path 53. The anode exhaust port 23 and the cathode exhaust port 25 are further connected thereto.

Furthermore, the manifold 41 is provided with a discharge path 55 communicating with the discharge port of the pump 7. The flow path 21 communicating with the pump 7 is connected to the discharge path 55. Namely, the discharge path 55 constitutes a part of the flow path 21. The manifold 41 has threaded openings for direct fixation of the pump and such.

Still furthermore, the manifold 41 has a passage 57 through which the anode supply path 31 interconnecting the mixing tank 5 and the fuel cell 9 passes. Namely, the passage 57 constitutes a part of the anode supply path 31.

The aforementioned constitution provides a preferable environment for power generation by the fuel cell 9 with the methanol-water mixture and the air. The temperature of the fuel cell 9 is kept from 60 degrees C. to 80 degrees C. preferable to the power generation because the manifold 41 and thermal insulation space 47 are such configured to properly regulate heat conduction from the fuel cell 9.

As well as thermal regulation means mentioned above, the manifold 41 functions as a passageway for the various flow paths. As mentioned above, the air inlet port 35, the suction path 53, the discharge path 55 and the passage 57 pass through the manifold 41. The manifold 41 collectively supports these flow paths and any other particular members but the manifold 41 are unnecessary for supporting the flow paths and interconnecting the respective elements. The total constitution can be miniaturized and easily manufactured.

Namely, the manifold 41 partitions the interior of the casing 15 into the heat-source compartment 43 and the normal-temperature compartment 45 and collectively supports the flow paths, thereby the fuel cell 9 is effectively kept at preferable temperatures and the total constitution can be miniaturized.

Moreover, the elements housed in the normal-temperature compartment 45 are hardly influenced by heat generated by the fuel cell 9 because the interior of the casing 15 is partitioned by the manifold 41. The gas-liquid separation film 49 disposed at the air inlet port 35 prevents the liquid from leaking outward when operation of the fuel cell 9 is stopped. The filter 51 disposed at the air inlet port 35 prevents dust in the air from intruding into the interior.

Figure 6:
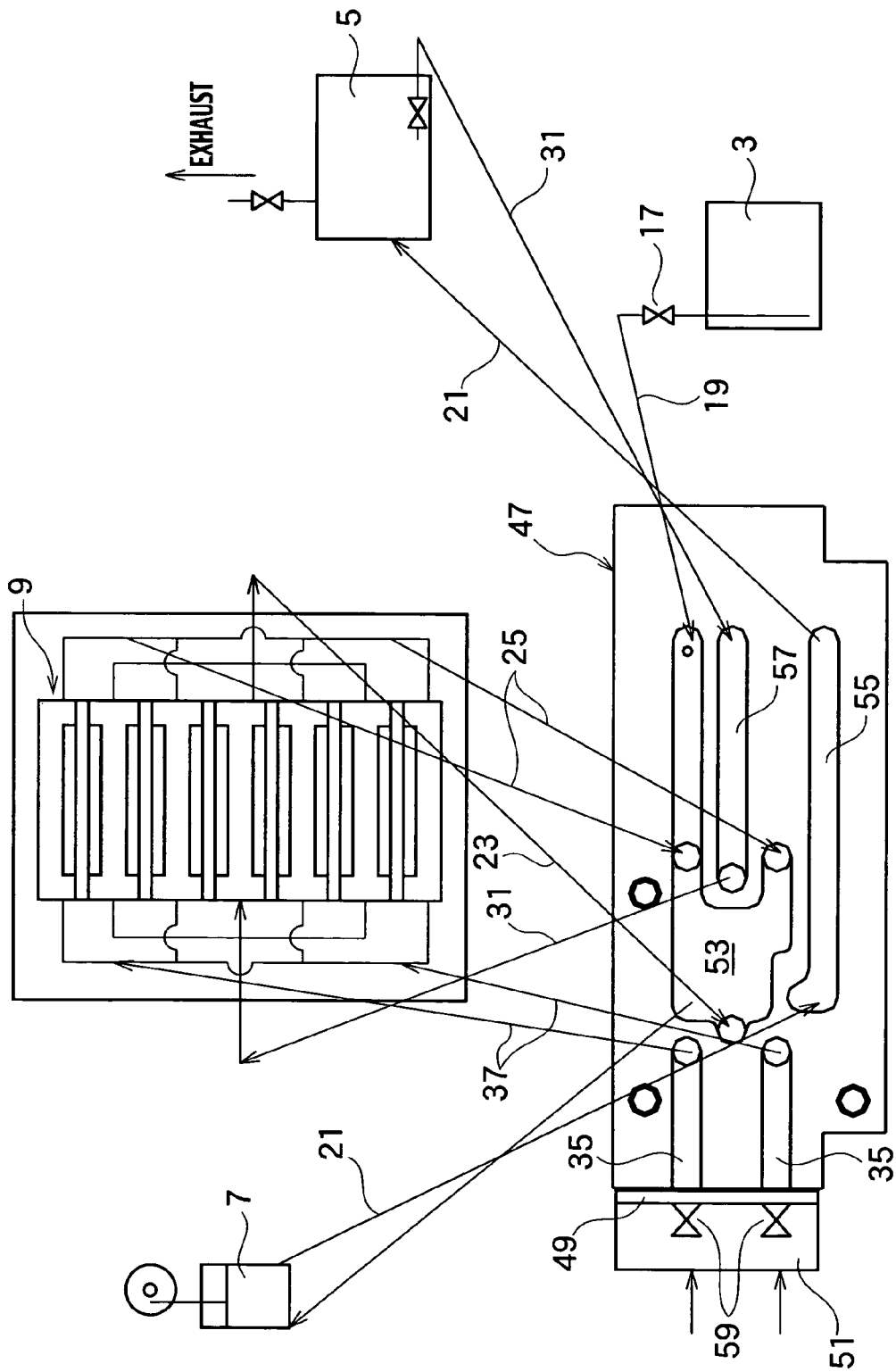
FIG. 6 is a schematic drawing of a constitution modified from the constitution shown in FIG. 5.

The aforementioned constitution can be modified into a constitution shown in FIG. 6, in which an open-close valve 59 is disposed at the air inlet port 35, so as to prevent the liquid from leaking outward. The open-close valve 59 is configured to be closed when the operation of the fuel cell 9 is stopped.

Figure 7:
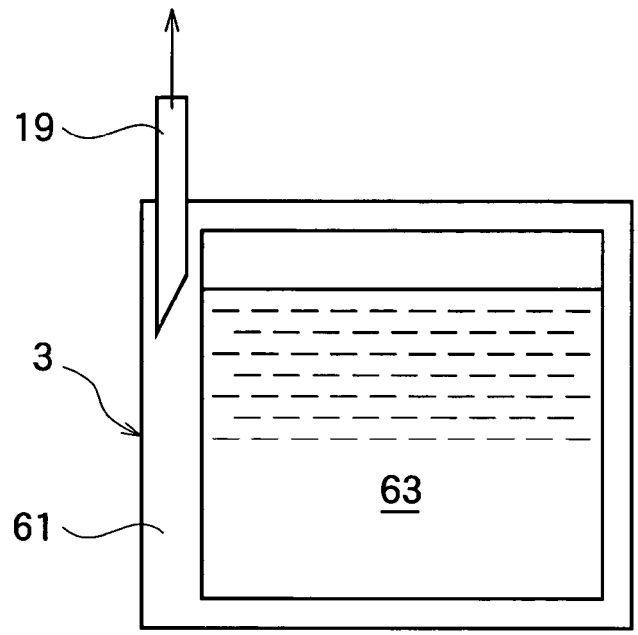
FIG. 7 is a schematic drawing of a fuel tank according to an embodiment of the present invention.

The fuel tank 3 can be constituted as shown in FIG. 7 so as to steadily discharge the fuel even how the casing 15 is oriented, in which a porous body 61 such as a sponge is disposed along the interior wall of the fuel tank 3 and an inner end of the flow path 19 abuts on or sinks into the porous body 61. The porous body 61 has capillary force so that the fuel 63 therein is collected and fed to the flow path 19. The porous body 61 is preferably configured to cover the whole interior wall of the fuel tank 3, however, may be configured to cover limited area of the interior wall under a condition that contact between the fuel 63 and the porous body 61 is steadily ensured wherever the casing 15 is oriented. For example, the porous body 61 may be formed in an angular horseshoe shape in section and cover only three faces of the interior wall of the fuel tank 3.

According to the above constitution, wherever the casing 15 is oriented, the fuel 63 therein and the porous body 61 are steadily kept in contact. Provided that a negative pressure is applied to the contact portion between the flow path 19 and the porous body 61, the fuel 63 is fed to the flow path 19 by means of the capillary force of the porous body 61. Thereby the fuel tank 3 steadily discharges the fuel wherever the casing 15 is oriented.

Figure 8:
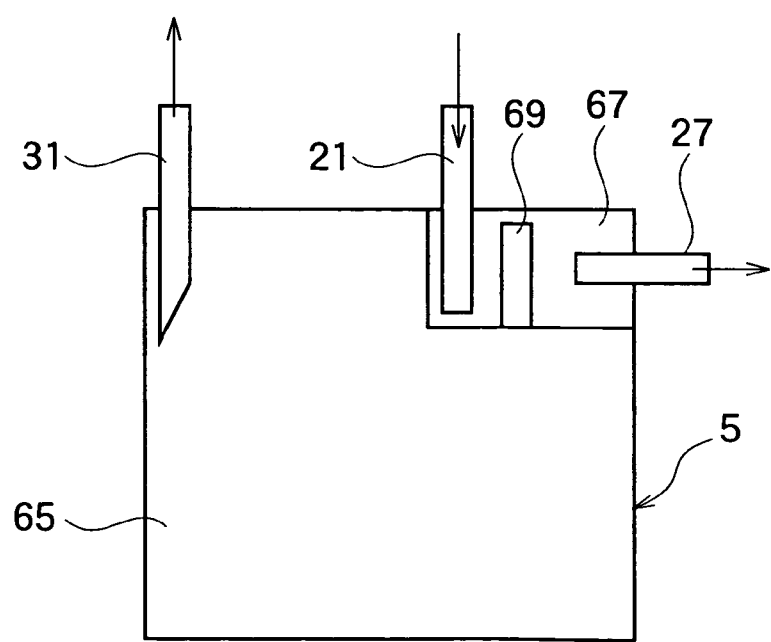
FIG. 8 is a schematic drawing of a mixing tank according to an embodiment of the present invention.

Furthermore, the mixing tank 5 can be constituted as shown in FIG. 8, in which a porous body 65 similar to the porous body 61 of the fuel tank 3 is housed in the mixing tank 5. The porous body 65 such as a sponge is disposed along the interior wall of the mixing tank 5 and an inner end of the anode supply path 31 abuts on or sinks into the porous body 65. The mixing tank 5 is provided with a cavity portion 67 therein. An outflow opening of the flow path 21 and an inflow opening of the exhaust flow path 27 face to the cavity portion 67. The outflow opening of the flow path 21 is disposed in the vicinity of the porous body 65. An obstruction piece 69 is provided between the outflow opening of the flow path 21 and the inflow opening of the exhaust flow path 27 so as to obstruct direct fluid transfer therebetween. In other words, a transfer channel of the fluid (gas in the case), where the fluid transfers from the outflow opening of the flow path 21 to the inflow opening of the exhaust flow path 27, is configured to be a detour flow path.

According to the aforementioned constitution, wherever the mixing tank 5 is oriented, the mixture therein is fed to the anode supply path 31 by means of the capillary force of the porous body 65 in a case where a negative pressure is applied to the inner end of the anode supply path 31. Thereby the mixture tank 5 steadily discharges the mixture to the fuel cell 9 and hence steady power generation can be ensured wherever the mixture tank 5 is oriented.

Further according to the aforementioned constitution, the porous body 65 directly absorbs liquid contained in the fluid, which flows into the mixing tank 5 from the flow path 21 to form a gas-liquid two-phase flow, because the outflow opening of the flow path 21 is disposed in the vicinity of the porous body 65. Thereby gas-liquid separation is effectively achieved.

Gas contained in the fluid detours around the obstruction piece 69 toward the outflow opening of the exhaust flow path 27 and is hence exhausted through the exhaust flow path 27. Thereby the constitution can effectively prevents vapor of the mixture from escaping outward so that fuel consumption can be suppressed.

Figure 9:
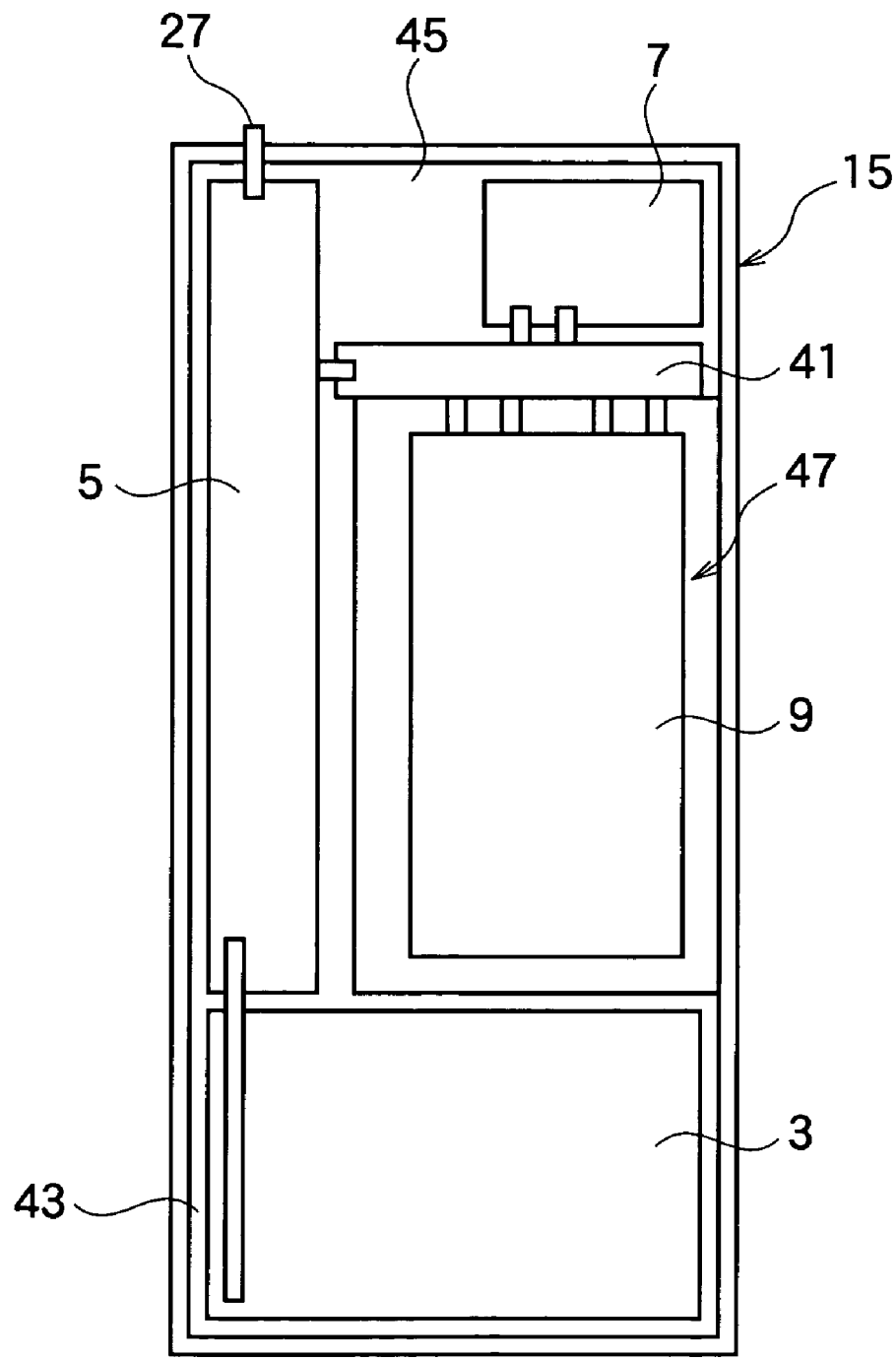
FIG. 9 is a schematic drawing of a packaging manner of the fuel cell unit modified from the packaging manner shown in FIG. 4.

The embodiment shown in FIG. 4 can be modified as shown in FIG. 9. According to the modified embodiment, the fuel tank 3 and the mixing tank 5 are connected with each other (corresponding to the constitution shown in FIG. 3) and the mixing tank 5 is disposed across the heat-source compartment 43 and the normal-temperature compartment 45 so that the exhaust flow path 27 is disposed at the normal-temperature compartment 45. The same effect as the constitution shown in FIG. 4 can be obtained.

Figure 10:
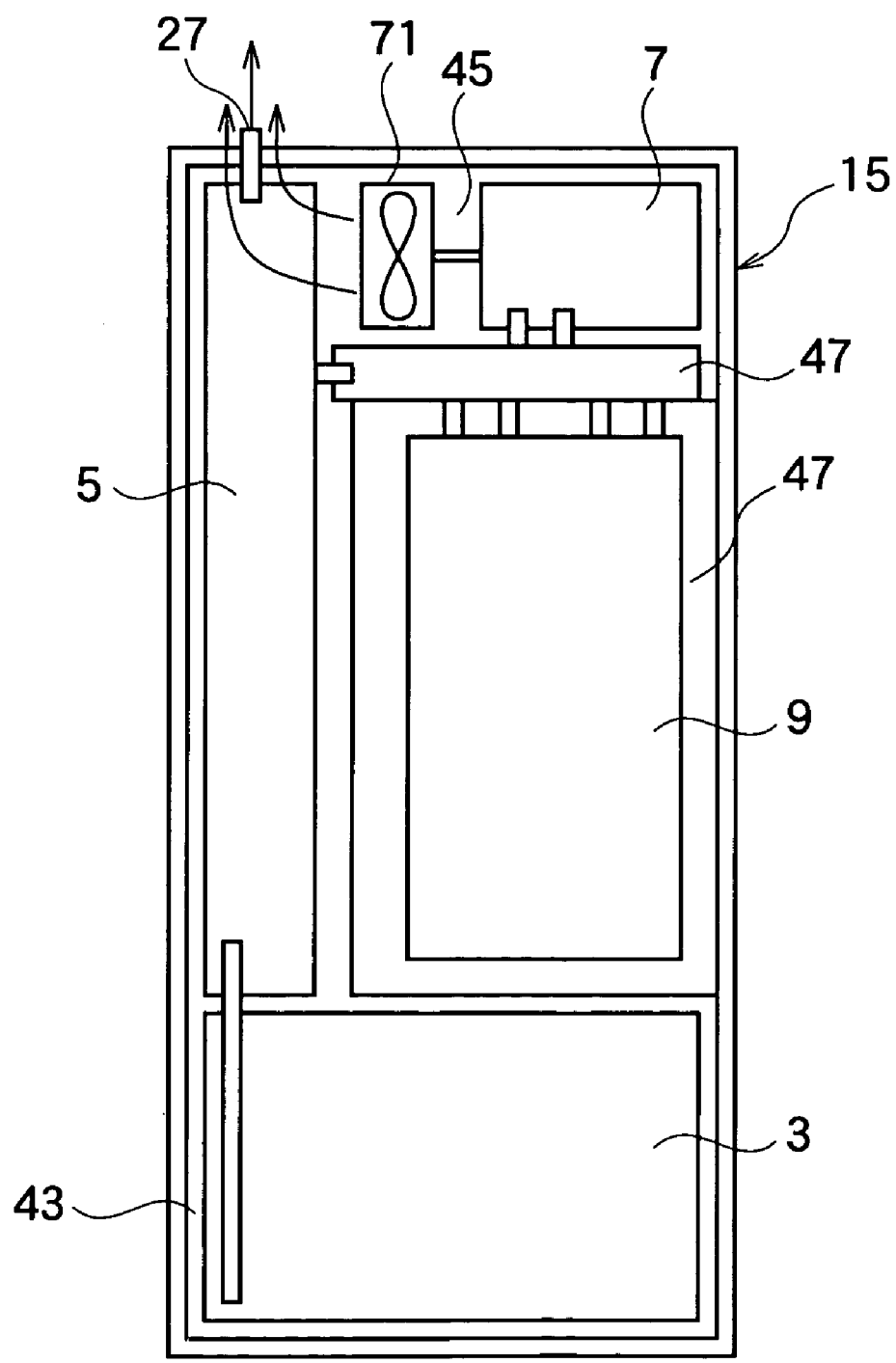
FIG. 10 is a schematic drawing of a constitution further modified from FIG. 9.

The aforementioned modification can be further modified as shown in FIG. 10. As compared with the constitution shown in FIG. 9, a fan 71 is added to a motor (not shown) for driving the pump 7. By means of rotating the fan 71, external air is introduced and fed to the vicinity of the exhaust flow path 27 so that the fed air flows in the same direction as the gas flowing in the exhaust flow path 27.

The air fed by the fan 71 cools the vicinity of the exhaust flow path 27 so that the gas exhausted from the mixing tank 5 is cooled. The constitution reduces the vapor content of the exhaust gas and hence effectively prevents vapor from escaping. Thereby fuel consumption can be suppressed.

Moreover, the air fed by the fan 71 gets the exhausted gas away from the casing 15 because these flow directions are correspondent. Thereby the vapor contained in the exhausted gas is effectively prevented from condensing around the exhaust flow path 27.

Figure 11A:
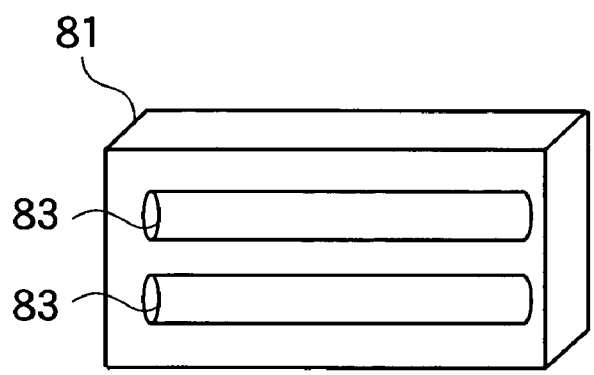
FIG. 11A is a schematic drawing of a partition wall according to an embodiment of the present invention.

The manifold 41 as a partition can be modified to be a partition wall 81 as shown in FIG. 11A. The partition wall 81 partitions the interior of the casing 15 into the heat-source compartment 43 and the normal-temperature compartment 45, similarly to the manifold 41. The partition wall 81 is provided with a plurality of tubes 83 (only two tubes 83 are exemplarily shown in FIG. 11A) on one side thereof, which constitutes the aforementioned flow paths partly.

Figure 11B:
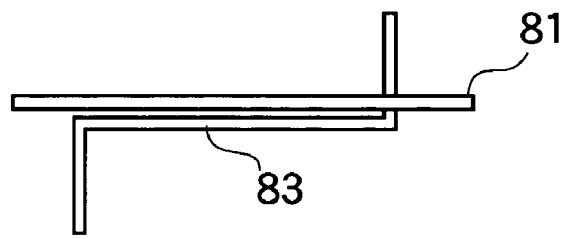
FIG. 11B is a schematic drawing of a partition wall according to a modified embodiment of the present invention.
Figure 11C:
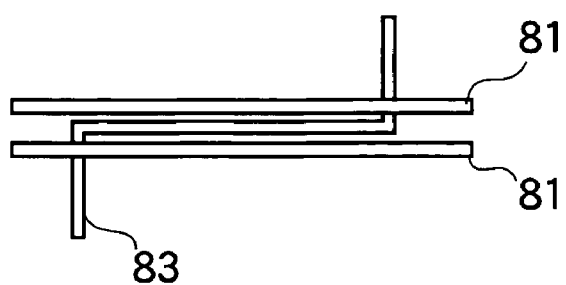
FIG. 11C is a schematic drawing of paired partition walls according to another embodiment of the present invention.

One partition wall 81 can be provided as shown in FIG. 11B, however, a pair of partition walls 81 can be provided as shown in FIG. 11C. The pair of partition walls 81 are disposed in parallel with each other and the tubes 83 are put therebetween. Each of the partition walls 81 can be formed in an angular horseshoe shape in section. The tubes 83 are prevented from being disordered because the paired partition walls 81 sandwich them.

The tubes 83 may be fixed by means of any fixation parts or adhesive. The tubes 83 are preferably inserted in openings or slits of the partition wall(s) 81 as shown in FIG. 11A or 11B and hence fixed. In this case, the partition wall(s) 81 function as partly a partition and partly a fixation member, and therefore any other fixation member can be omitted.

Although the invention has been described above by reference to certain embodiments of the invention, the invention is not limited to the embodiments described above. Modifications and variations of the embodiments described above will occur to those skilled in the art, in light of the above teachings.

What is claimed is:
1. A fuel cell unit comprising:
a fuel cell for electric power generation, the fuel cell having a cathode and an anode;
a mixing tank housing a mixture of fuel and exhaust water from the fuel cell;
a fuel tank housing fuel;
a pump delivering the mixture to the anode and air to the cathode;
a casing housing the fuel cell, the pump and at least one of the fuel tank or the mixing tank; and
a partition partitioning an interior of the casing into a first compartment housing the fuel cell and a second compartment, the partition comprising first, second and third flow paths, the first flow path connecting the mixing tank to the fuel cell, the second flow path connecting the fuel cell to the pump, the third flow path connecting the pump to the mixing tank wherein the partition comprises a manifold including the first, second and third flow paths.

2. The fuel cell unit of claim 1, wherein:
the first compartment includes a thermal insulation material to restrict heat transfer from the first compartment to the second compartment.

3. The fuel cell unit of claim 1, wherein:
the partition comprises one or more partition walls having the flow paths disposed at one side thereof or therebetween.

4. The fuel cell unit of claim 1, wherein:
the partition comprises an air inlet port.

5. The fuel cell unit of claim 4, further comprising:
a gas-liquid separation film disposed at the air inlet port.

6. The fuel cell unit of claim 4, further comprising:
a regulation valve disposed at the air inlet port.

7. The fuel cell unit of claim 5, further comprising:
a filter disposed at the air inlet port.

8. The fuel cell unit of claim 1, further comprising:
a fan driven by the pump so as to cool the mixing tank.

9. The fuel cell unit of claim 1, wherein:
the fuel cell comprises a direct methanol fuel cell.

10. The fuel cell unit of claim 1, wherein:
the fuel comprises methanol.

11. The fuel cell unit of claim 1, wherein:
the mixing tank is connected to the fuel cell;
wherein the fuel tank is connected to the mixing tank; and
the pump is connected to both the fuel cell and the mixing tank, the pump negatively pressurizing the fuel cell whereby delivery of the fuel to the mixing tank and delivery of the mixture and air to the fuel cell are done by the pump.

12. The fuel cell unit of claim 1, wherein the fuel tank includes a porous body disposed along an interior wall of the fuel tank and a flow path connecting the porous body to the fuel cell.

13. The fuel cell unit of claim 1, wherein the mixing tank includes a porous body disposed along an interior wall of the mixing tank, a cavity portion, an inflow path connecting the fuel cell to the cavity portion and an exhaust flow path connecting the cavity portion to an outside of the mixing tank.

14. The fuel cell unit of claim 13, wherein the cavity portion includes an obstruction piece configured to obstruct direct fluid transfer from the inflow path to the exhaust flow path.

* * * * *